United States Patent
Simplicean

[19]
[11] Patent Number: 5,975,625
[45] Date of Patent: Nov. 2, 1999

[54] AUTOMOTIVE VEHICLE BODY HAVING A PLASTIC OUTER BODY AND AN INNER METAL FRAME

[75] Inventor: Ionel Eugene Simplicean, Dearborn Heights, Mich.

[73] Assignee: Ford Motor Company, Dearborn, Mich.

[21] Appl. No.: 08/953,675

[22] Filed: Oct. 17, 1997

[51] Int. Cl.[6] .................................................. B60J 7/00
[52] U.S. Cl. .................... 296/205; 296/203.01; 296/901; 296/186; 280/834
[58] Field of Search .................. 296/205, 203.01, 296/186, 35.1, 901; 280/834, 830, 785

[56] References Cited

U.S. PATENT DOCUMENTS

| | | | |
|---|---|---|---|
| Re. 33,769 | 12/1991 | Harrod | 296/205 |
| 2,525,339 | 10/1950 | Chausson | 296/186 |
| 2,668,722 | 2/1954 | Muller | 296/203.01 |
| 2,973,220 | 2/1961 | White | 296/901 |
| 3,097,879 | 7/1963 | Looper | 296/35.1 |
| 4,453,763 | 6/1984 | Richards | 296/901 |
| 4,553,783 | 11/1985 | Lagana | 296/901 |
| 4,709,958 | 12/1987 | Harrod | 296/186 |

FOREIGN PATENT DOCUMENTS

| | | | |
|---|---|---|---|
| 965453 | 4/1975 | Canada | 296/901 |
| 483446 | 12/1952 | Italy | 296/205 |
| 0130868 | 8/1982 | Japan | 296/901 |
| 0045218 | 3/1984 | Japan | 296/901 |
| 0057378 | 3/1988 | Japan | 296/901 |
| 1237615 | 6/1971 | United Kingdom | 296/901 |

OTHER PUBLICATIONS

"Cars Detroit Never Built" by Edward Janicki Published by Sterling Publishing Co., New York: pp. 43,48,120,128,129, 172,173.

Primary Examiner—Joseph D. Pape
Assistant Examiner—Kiran Patel
Attorney, Agent, or Firm—Damian Porcari

[57] ABSTRACT

An automotive vehicle can be built to include a one piece plastic outer body and a metal support frame underlying the outer body. The outer body is preferably formed by a blow molding process or rotational casting process, so that the body has integral hollow double wall sections that are relatively strong and resistant to bending or twisting forces. The plastic body can include various built-in features, e.g. an integral self-contained fuel tank formed by the molding process. The metal support frame is preferably made up of longitudinal and transverse tubular frame elements. Support pads are provided at selected points on the frame for connecting the plastic body to the frame.

11 Claims, 5 Drawing Sheets

AUTOMOTIVE VEHICLE BODY HAVING A PLASTIC OUTER BODY AND AN INNER METAL FRAME

BACKGROUND AND SUMMARY OF THE INVENTION

This invention relates to an automotive vehicle, and especially to a vehicle that includes a plastic outer body and an interior metal support frame for the plastic outer body. In preferred practice of the invention the plastic outer body is a one-piece plastic molding formed in a one-step operation by a blow-molding process or a centrifugal casting process.

Such molding processes advantageously enable the plastic outer body to have hollow wall areas at selected points, whereby the body is reinforced against bending, twisting or deformation. The blow-molding process is advantageous in that it has a relatively fast cycle time. The centrifugal casting process is advantageous in that it produces smooth surfaces free of mold marks; also the centrifugal casting process enables the color of the plastic body to be changed after each mold cycle, which is advantageous in short production runs.

A general advantage of a plastic outer body is that it is resistant to attack by gasoline, oil, grease and other chemicals. Plastic is easy to clean, and is resistant to corrosion and ultra violet rays. The plastic material herein envisioned will not crack, chip or break at elevated temperatures normally encountered in normal vehicle use.

The invention contemplates a modified monocoque vehicle design, wherein major loads are transferred between a plastic body and a metal support frame (or chassis). In this regard, the term "monocoque" refers to a vehicle body that relies on a light weight shell to bear the principal stresses. In the present invention a strong hollow-walled plastic shell is combined with a rigid metal frame so that the shell and frame share the major stresses.

The composite vehicle body structure of the present invention is designed so that the frame component can be used as a cooling fixture for supporting the plastic outerbody while the plastic component is cooling (i.e. immediately after the plastic outerbody has been formed). This feature greatly simplifies the material handling process in the manufacturing facility.

In preferred practice of the invention the plastic body component is a single plastic member formed by a blow molding operation or a rotational casting process. However, the plastic body component can alternately formed by two or three interchangeable body sections securable together by mechanical or adhesive connections in "leggo" fashion. By employing plural interchangeable body sections it is possible to change the manufacturing from four seat to a five seat vehicle very quickly (e.g. in hours). This feature provides great marketing flexibility.

The metal frame component of the composite vehicle is preferably located entirely within the plastic outerbody. However, in extended practice of the invention the metal frame component could be at least partially outside the plastic component. For example, portions of the metal at the front and rear ends of the vehicle could be located outside the plastic shell to form front and rear bumpers.

Important advantages achieved by the invention are cost reduction and weight reduction. Hollow-wall sections resulting from the molding process greatly stiffen and rigidify the plastic outerbody so as to greatly reduce the need for extraneous reinforcement mechanisms that add to overall vehicle weight.

Preferably the vehicle body is designed so that the plastic body component has no metal inserts permanently attached to the plastic material. Should it be necessary to convert the vehicle to scrap (after it's useful life) the metal frame can be separated from the plastic outerbody; the lack of metal inserts in the plastic body enables the plastic material to be readily recycled without excessive labor costs.

In preferred practice of the invention the plastic body component is formed out of a thermoplastic material (rather than a thermoset plastic). The molded plastic is a pure homogenous material that can be repaired, if necessary, by the use of fusion equipment. In this sense, the plastic body material differs from reinforced fiber-plastic composites heretofore used in some plastic vehicle structures and plastic boat structures.

The plastic outer body is preferably formed by a blow-molding operation, using a thermoplastic polyolefin material in an extruded parison form. However, the plastic outer body can also be formed by a rotational casting process. Further features of the invention will be apparent from the attached drawing and description of an illustrative embodiment of the invention.

BRIEF DESCRIPTION OF THE DRAWINGS

FIG. 6 represents the preferred apparatus.

DESCRIPTION OF A PREFERRED EMBODIMENT OF THE INVENTION

Figure 1:
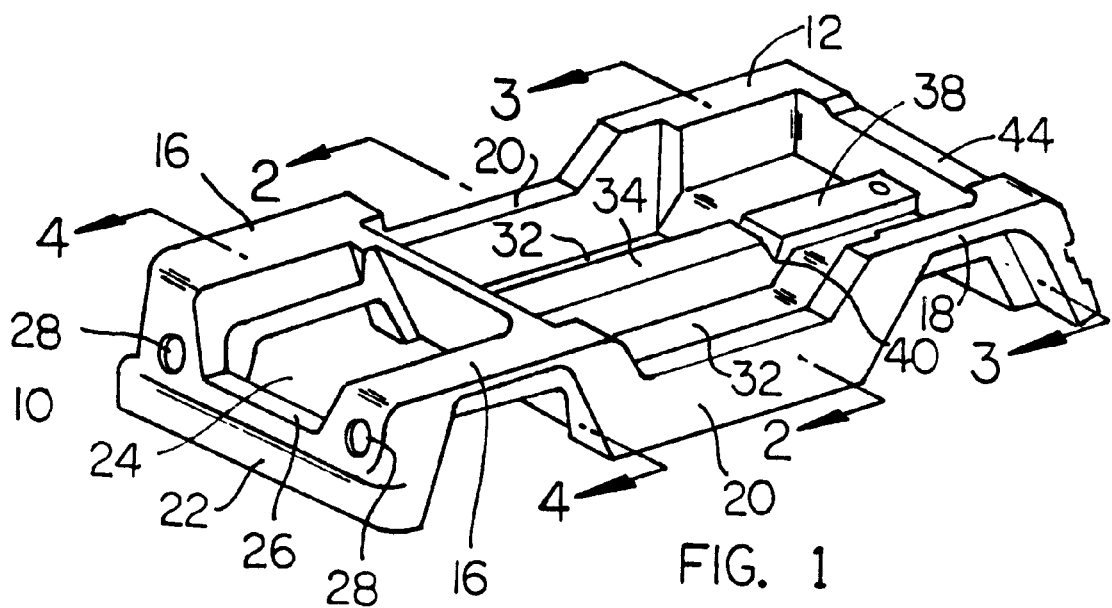
FIG. 1 is a perspective view of a vehicle body structure embodying the invention.
Figure 5:
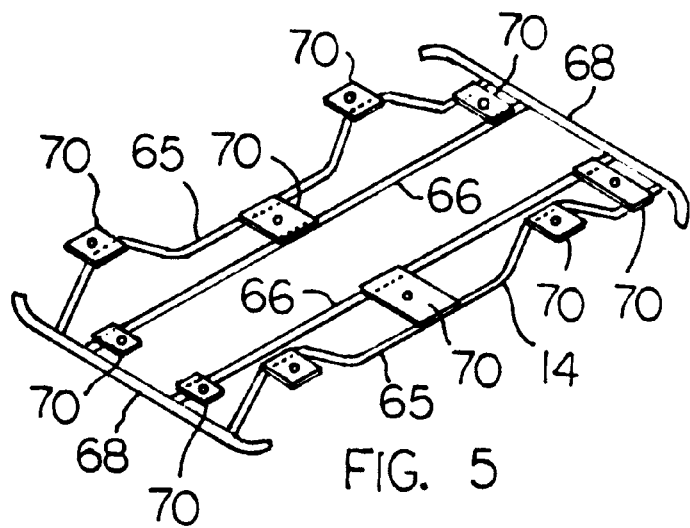
FIG. 5 is a perspective view of a metal support frame used in the FIG. 1 vehicle body structure. The metal support frame is hidden in FIG. 1.
Figure 2:
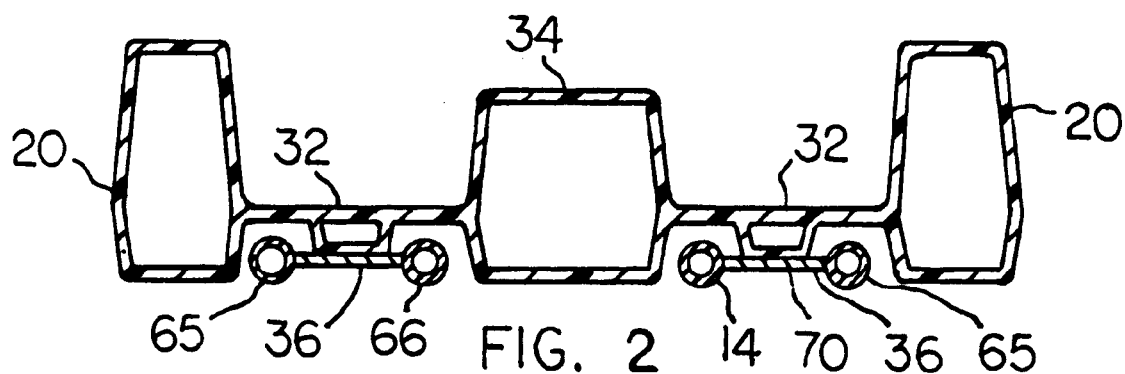
FIG. 2 is a transverse sectional view taken on line 2—2 in FIG. 1
Figure 3:
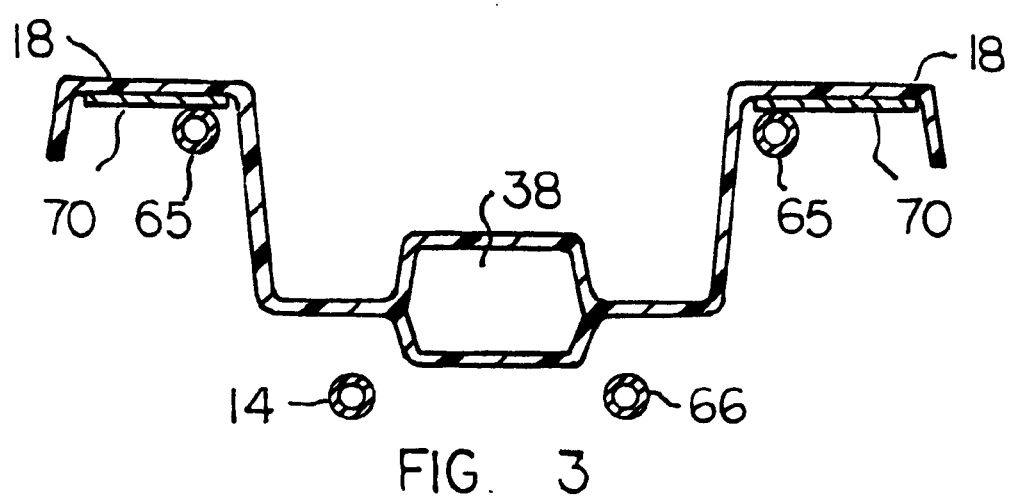
FIG. 3 is a transverse sectional view taken on line 3—3 in FIG. 1
Figure 4:
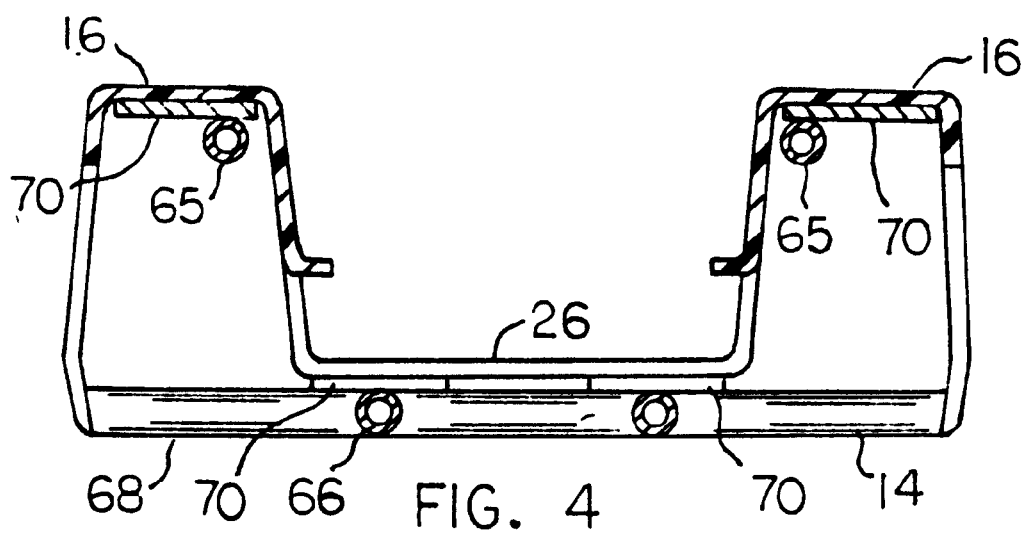
FIG. 4 is a transverse sectional view taken on line 4—4 in FIG. 1

Referring to FIGS. 1 through 5, there is fragmentarily shown an automotive vehicle 10 comprising a plastic outer body 12 and a metal support frame 14. The support frame is hidden from view in FIG. 1. FIGS. 2 through 4 show the frame cross section at selected points along the vehicle length dimension. FIG. 5 shows the metal frame separated from the plastic outer body.

Plastic outer body 12 comprises two molded front fenders 16, two molded rear fenders 18, and two integral side panels 20 interconnecting said fenders. The front portion of the plastic body forms an integral front bumper 22; similarly, the rear portion of the plastic body defines a rear bumper (not visible in FIG. 1).

The front central portion of the plastic body is cut away to define an engine compartment 24. Sill area 26 at the front end of the plastic body provides a support surface for a radiator and front grille, not shown. Also, the forwardly facing surfaces of the front fenders 16 have openings 28 therein for the headlights.

It will be appreciated that compartment 24 is normally equipped with a hinged hood (or cover), whereby the engine is protected and concealed from view. The hood, not shown, is mounted on the vehicle body subsequent to formation of the plastic outer body on metal frame 14. The present invention is concerned primarily with the combinational relationship of the plastic outer body 12 and interior support frame 14.

The front fenders 16 and rear fenders 18 are connected by molded side panels 20. As shown in FIG. 2, these molded side panels are hollow double-wall structures designed for strength and twist-resistance. The passenger area of the vehicle is defined by a molded floor 32 that is strengthened by an integral tunnel 34 and two integral hollow beams 36 spaced on either side of the tunnel, as shown in FIG. 2. Tunnel 34 forms a console separating the passenger compartment into right and left seating areas. The seats, not shown, are installed separately on the floor areas 32.

Figure 6:
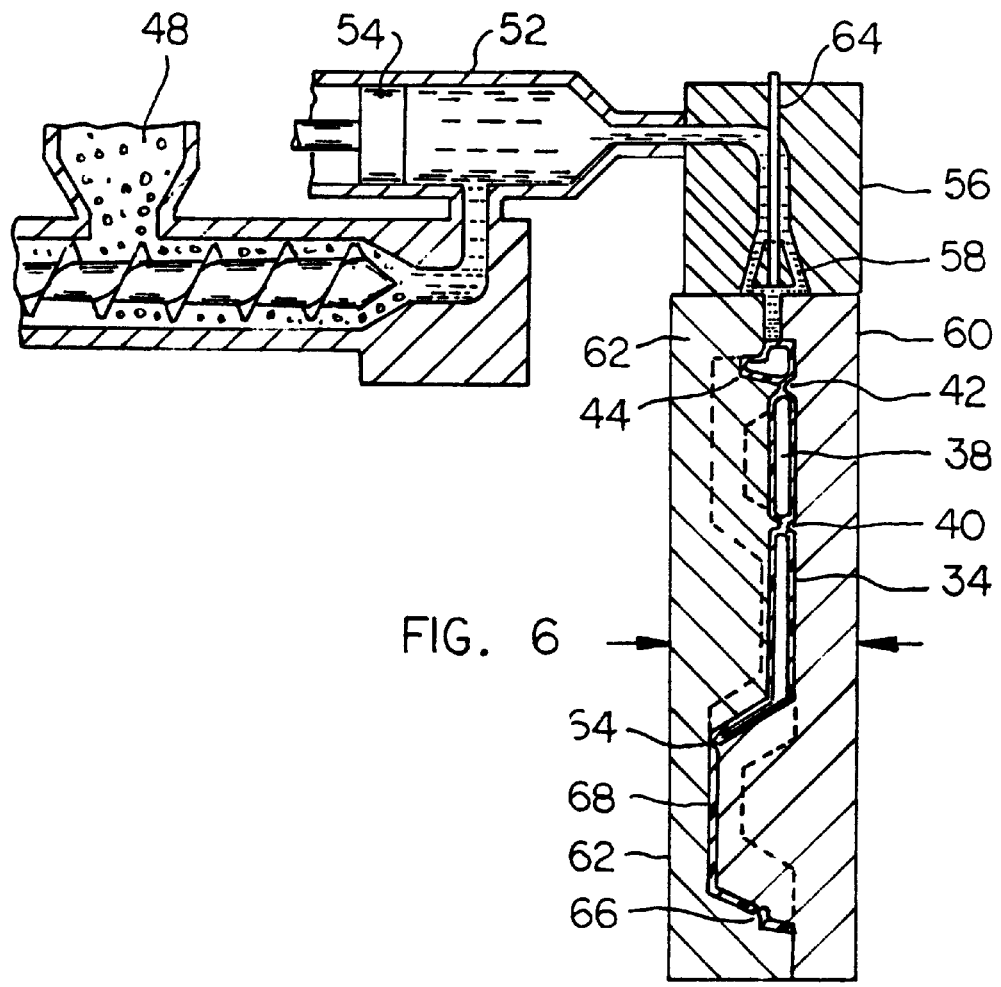
FIG. 6 is a schematic representation of a blow-molding apparatus that can be used to form the plastic outer body in the FIG. 1 vehicle body structure.

A further feature of interest is an integral molded fuel tank 38 located between the rear fenders 18 in alignment with tunnel 34. The front end of the fuel tank is sealed by forming a partition in tunnel 34, as shown at 40 in FIG. 6. The rear end of the fuel tank is similarly sealed by a partition 42 located at the rear wall 44 of the vehicle. As shown in FIG. 6, rear wall 44 is a hollow double-walled structure designed for strength and rigidity.

Figure 7:
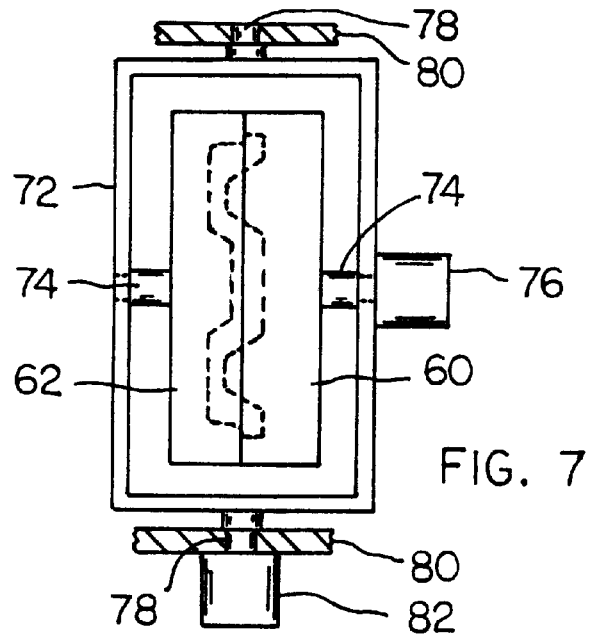
FIG. 7 shows a rotational casting apparatus that can be used as an alternative to the blow-molding apparatus of FIG. 6.

The plastic outerbody 12, shown in FIGS. 1 through 4, is preferably a one-piece plastic molding formed in a one-step molding operation. One preferred molding apparatus is a blow-molding machine of the type shown in FIG. 6. Alternately, the body can be formed by a centrifugal casting process, as illustrated in FIG. 7.

The machine depicted in FIG. 6 comprises an extruder 46 that receives pellets (granules) of a suitable resin (preferably a polyolefin material) from a hopper 48. The resin is advanced by the extruder into a heater 50, where it is transitioned to a molten state and pumped into an accumulator 52. A ram 54 in the accumulator applies a suitable pressure to the molten resin (e.g. two hundred fifty p.s.i.), such that the resin is moved into a discharge head 56.

Head 56 forms the resin into an annular tubular parison 58 of a suitable wall thickness for delivery into a mold cavity formed by mold sections 60 and 62. The annular parison gravitationally is delivered into the space between mold sections 60 and 62 while the mold sections are separated. As the mold sections close together, as represented by the arrows in FIG. 6, pressurized air is pumped downwardly through a central pipe 64 into the space circumscribed by the resinous parison; at such time the resin wall is in a flowable fluid-like state, so that air pressure exerted on the resin wall expands or deflects the resin film against the oppositely-facing mold cavity surfaces. This action produces the various hollow walls depicted in FIGS. 2,3 and 6 of the drawings. The wall thickness can be monitored as needed.

During the period when the molded wall structure is being formed, the mold sections 60 and 62 may be heated, to ensure that the pressurized resin will fully conform to the mold cavity surfaces. When the molded body 12 has been formed the mold sections can be switched to a cooling mode to cool and at least partially cure the molded article.

Mold sections 60 and 62 include mating knife edges at 67 and 69, designed to sever (or substantially sever) the intervening resin wall area 68. The severed wall area is removed to form the engine compartment access opening depicted in FIG. 1.

Blow molding has been used to form various hollow plastic structures e.g. plastic bottles, jars and huge containers. The blow molding operation is advantageous in practice of the present invention in that the intricate hollow, double-walled structure can be incorporated into the automotive vehicle outerbody, as shown in FIGS. 2, 3, 4 and 6, to provide a sturdy outerbody. The molding operation is carried out so that the tubular resinous parison is fed into the mold cavity by gravitational force, as shown in FIG. 6. The molded vehicle outerbody has a vertical "on end" orientation in the mold cavity.

As previously noted, the plastic outer body 12 is supported on a metal frame 14. As shown in FIG. 5, the metal frame comprises two outer frame elements 65, extending longitudinally parallel to the vehicle central axis, two inboard frame elements 66 extending longitudinally generally parallel to frame elements 65 and two transverse frame elements 68 interconnecting frame elements 65 and 66 at the front and rear ends of the plastic outerbody 12. Each frame element is preferably a tubular steel element having a circular cross section, for cost reasons. Other cross sectional shapes can be used, but at some added cost.

Metal frame 14 is connected to the plastic outer body 12, at plural spaced points, via pads 70. Each pad can comprise a metal plate welded to the associated tubular frame element so as to be in facial contact with a surface portion of the plastic body 12. The upper face of each pad 70 conforms to the contour of the associated plastic surface, so that each pad has extensive area engagement with the plastic body. Where the contacted surface of the plastic body has a curvature the pad will have a similar curvature in order to achieve the desired extensive area engagement. The aim is to minimize any concentration of forces at the pad-plastic body connection points.

The pad location and number of pads 70 can be varied according to the size and weight of the vehicle. As shown in the drawing, there are ten body-support pads 70. Four pads are located at the roof surfaces of the fenders, two pads are located at the front end of the vehicle underneath sill 26, and two pads are located at the rear end of the vehicle proximate to rear wall 44.

The plastic body 12 is preferably designed so that the pad contact surfaces are accessible to pads 70 without shifting the plastic body laterally or angularly. The preferred assembly procedure involves merely lowering the plastic body onto the metal frame with a straight downward motion (or raising the frame into the plastic body). In one contemplated scenario, the wheels, axles, wheel suspension and engine are mounted, or attached, to the metal frame 14 prior to lowering the plastic body onto frame 14.

The plastic outerbody can be transferred directly from the opened mold cavity to the metal frame, whereby the frame serves as a cooling fixture for the plastic body.

Various types of fasteners can be used to secure the plastic body 12 to mounting pads 70. The selected fasteners should allow for thermal expansion and contraction of the plastic body during service in a range of different environments.

The vehicle running gear (comprising the engine, wheel suspension, brakes and steering) is mounted primarily on the metal frame. Road forces are transmitted through the wheel suspension to the metal frame. The vehicle load (humans and cargo) is carried by the plastic body. The plastic body and metal frame are mutually self-reinforcing, to a certain extent.

Figure 9:
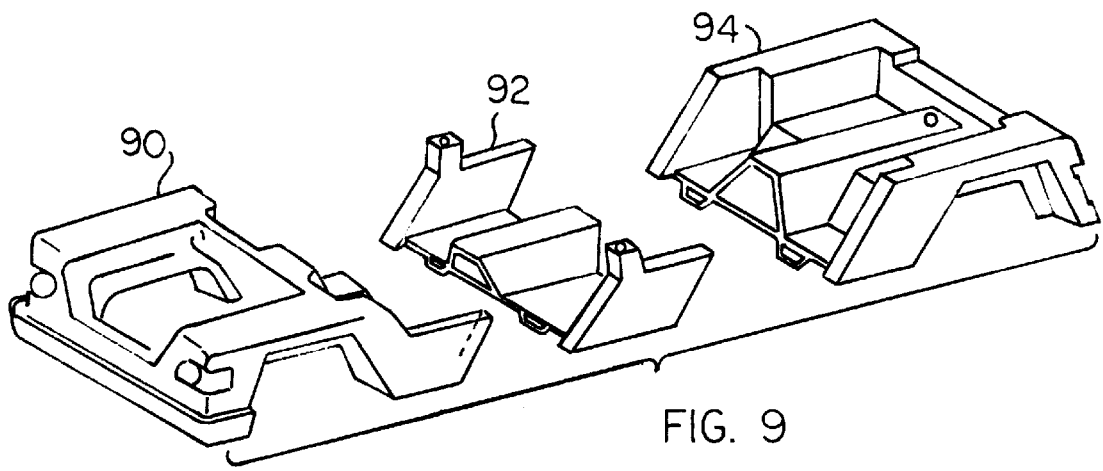
FIG. 9 is an exploded perspective view of a three piece molded outer body that can be used with a metal support frame of the type shown in FIG. 5.
Figure 10:
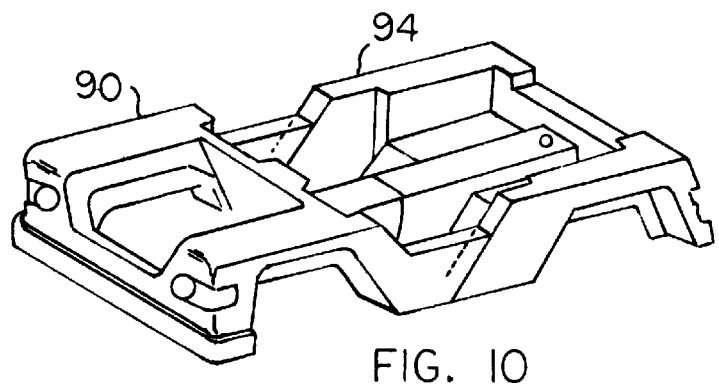
FIG. 10 is a perspective view of a molded plastic outer body formed by combining two of the plastic body components depicted in FIG. 9.
Figure 11:
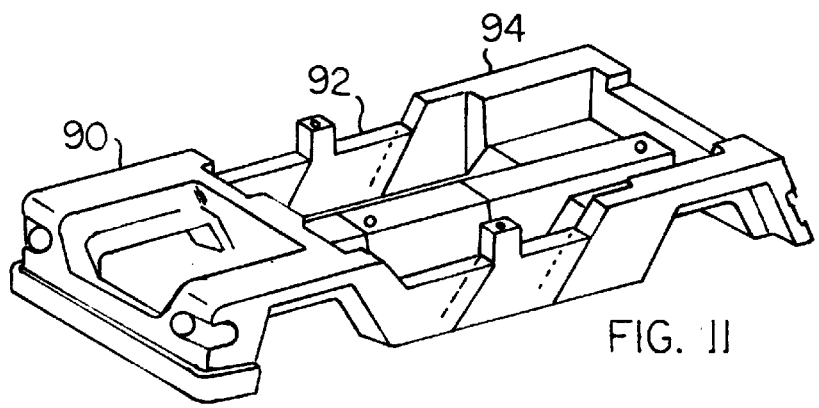
FIG. 11 is a view taken in the same direction as FIG. 10, but showing a plastic outer body formed by combining all three of the body components depicted in FIG. 9.

FIGS. 1 through 4 represent the preferred plastic body comprised of a single molded unit. However, in extended practice of the invention the plastic body could be formed of two or more molded sections fastened together with screws, bolts, fusion adhesion, or other fastening devices. FIG. 10 shows a plastic outer body formed of two sections. FIG. 11 shows a plastic body formed of three sections. As shown in FIG. 9, the plastic outerbody is sectionalized (molded) as a front body section 90, center body section 92, and rear body section 94. Body sections 90 and 94 can be secured together in leggo fashion to form the vehicle body of FIG. 10. The three body sections 90, 92 and 94 can be secured together to form the elongated body of FIG. 11. Either vehicle body can be used for carrying passengers and/or cargo. FIG. 10 represents a four seater version, whereas FIG. 11 represents a six seater version.

The multi-piece plastic outer body of FIG. 10 or FIG. 11 can be mounted on a metal support frame of the type shown in FIG. 5, within the scope of the present invention. Preferably the multi-piece plastic body is assimilated into a unitary structure prior to placement on the metal frame.

FIG. 7 shows an alternate molding apparatus that can be used to form the plastic body (or plastic body sections). The apparatus is a rotational casting (or centrifugal casting) machine, wherein the mold cavity is pre-loaded with a predetermined quantity of resinous powder prior to closure of the mold sections. The entire apparatus may be placed in an oven to melt the resinous powder in the mold cavity. At the same time, the mold assembly is rotated in two different planes at controlled velocities (not necessarily the same for both rotational planes) such that the resinous powders fuse together on the mold cavity surfaces. When the article (e.g. plastic vehicle body) is fully formed the entire apparatus is cooled to achieve the molded article.

Various mechanisms can be used to achieve the desired combination of mold rotational movements. As shown in FIG. 7, the mold sections are supported in a frame 72 that has aligned pivot shafts 74 connected to the mold sections or an associated carrier; a motor 76 is mounted on frame 72 to rotate the mold sections around a horizontal axis. The frame is supported by two aligned shafts (gimbals) 78 that are suitably mounted on a fixed structure 80; a second motor 82 is connected to one of the shafts 78 so as to rotate frame 72 (and the mold sections) around a vertical axis.

The rotational casting machine is characterized by very smooth product surfaces, and by the ability to change the color after each mold cycle (by selection of the resinous powdered raw material). The blow molding apparatus of FIG. 6 has the advantage of a short cycle time.

Figure 8:
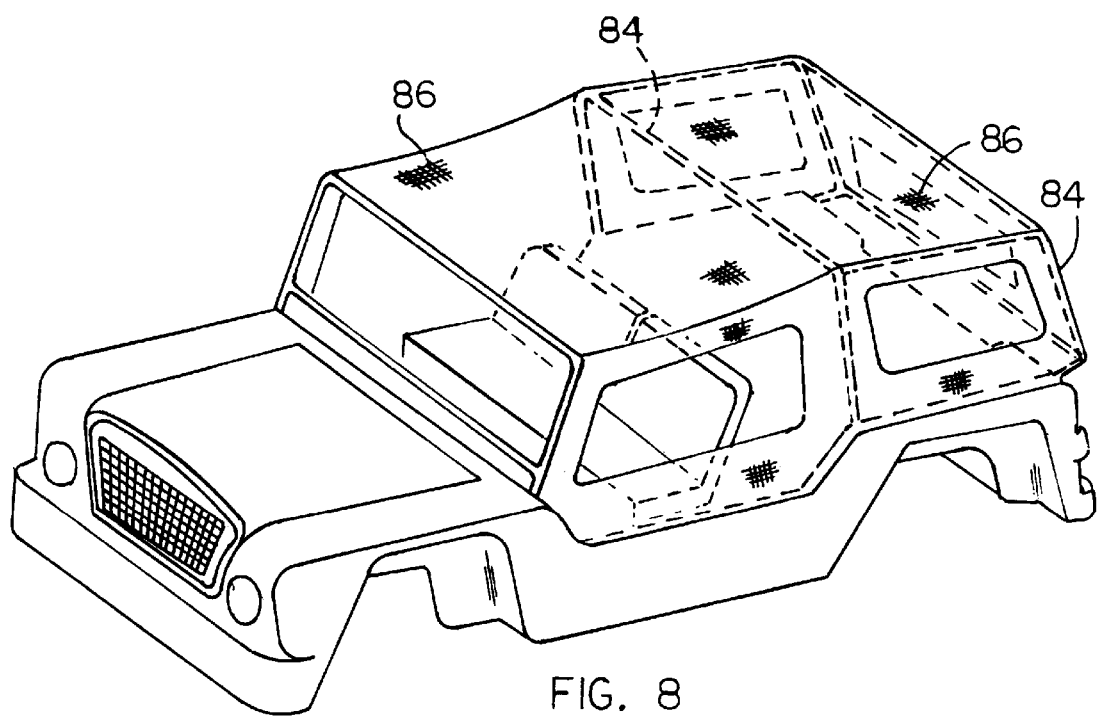
FIG. 8 is a perspective view of the FIG. 1 vehicle body structure augmented by a soft canvas top structure. A tubular frame is affixed to the vehicle body to support the canvas top. In an alternative arrangement, not shown, the top structure can be a one piece hard top, bolted or otherwise affixed to the basic vehicle body structure.

The plastic outer body and metal frame assembly depicted in FIGS. 1, 10 and 11, can be equipped with either a hard top structure (not shown), or a soft canvas top structure, as shown e.g. in FIG. 8. Referring to FIG. 8, a separate tubular framework 84 is mounted on the upper edge surfaces of the plastic outer body 12, after which a canvas covering 86 can be placed over framework 84. The windshield may be attached to outer body 12, after which a canvas covering 86 can be placed over framework 84. The windshield may be attached to outer body 12 in any desired fashion.

The invention is particularly concerned with the plastic outer body 12 and its relation to metal frame 14. FIG. 8 merely illustrates one particular top structure that could be used on the vehicle body. Other top structures could be used.

It will be realized that the styling of the plastic outer body can be changed or varied while still practicing the invention. The molding process can be carried out to provide various integral built-in features, e.g. fuel tank, battery tray, fenders, front or rear seats, seat channels, headlight housings, tail light housings, instrument panel, dual steering wheel mounts (right and left), cup holder, spare tire recess, cargo hold-down anchorages, and frame attachment surfaces. In some cases the mold sections will have to have retractable inserts in order to achieve undercut surfaces in the molded outer body. The invention can be practiced with varying body configurations and designs.

What is claimed:

1. An automotive vehicle comprising:
   a plastic body having two front fenders and two rear fenders, said plastic body further comprising a floor and an engine compartment;
   a metal frame underlying said plastic body; and plural connectors affixing said plastic body to said frame at spaced points along said frame, whereby the plastic body and frame share loadings imposed on the vehicle;
   said plastic body comprising two integrally molded hollow side panels joining the front and rear fenders;
   said plastic body further comprising an integral molded tunnel extending along the molded floor, and an integrally molded fuel tank aligned with said tunnel between the rear fenders;
   said metal frame comprising two outer longitudinal frame elements located within the width dimensions of the fenders, two inner longitudinal frame elements located inboard from the fenders, and plural transverse frame elements joining said longitudinal frame elements at the front and rear ends of the plastic body;
   said metal frame further comprising plural body-connection pads located at spaced points along said longitudinal frame elements; each pad being connected to the plastic body so that loads applied to said plastic body are transferred through the pads to said metal frame.

2. An automotive vehicle comprising:
   a plastic body having two front fenders and two rear fenders; said plastic body further comprising a floor, engine compartment, and an integrally molded fuel tank located between the rear fenders;
   a metal frame underlying said plastic body; and
   plural connectors affixing said plastic body to said frame at spaced points along said frame, whereby the plastic body and frame share loadings imposed on the vehicle.

3. The vehicle of claim 2, wherein said plastic body is a one piece plastic molding.

4. The vehicle of claim 2, wherein said plastic body comprises two integrally molded hollow side panels joining the front and rear fenders.

5. The vehicle of claim 2, wherein said metal frame comprises plural pads located at spaced points along said frame; each pad being affixed to the plastic body so that loads applied to said plastic body are transferred through the pads to said metal frame.

6. The vehicle of claim 5, wherein each said pad comprises a metal plate having extensive area engagement with the plastic body to minimize the concentration of forces at the pad-plastic body connection points.

7. The vehicle of claim 5, wherein said plural pads include a pad located within each fender, two pads at the front end of the plastic body, two pads are the rear end of the plastic body, and two pads located approximately midway between the front and rear fenders.

8. The vehicle of claim 5, wherein said metal frame is comprised of multiple tubular frame elements.

9. The vehicle of claim 5, wherein said metal frame comprises plural longitudinal frame elements extending the full length of the plastic body, and transverse frame elements joining said longitudinal frame at the front and rear ends of plastic body.

10. The vehicle of claim 9, wherein said longitudinal frame elements comprise two outer frame elements located within the width dimensions of the fenders, and two inner frame elements located inboard from the outer frame elements.

11. An automotive vehicle comprising:

a one piece molded plastic body having two integral front fenders, two integral rear fenders, an integral floor, and an engine compartment;

a metal frame underlying said plastic body; and plural connectors affixing said plastic body to said frame at spaced points along said frame, whereby the plastic body and frame share loadings imposed on the vehicle;

said plastic body comprising two integrally molded hollow side panels joining the front and rear fenders;

said metal frame comprising plural pads located at spaced points along said frame to form connection points between the frame and plastic body; each pad comprising a metal plate having extensive area engagement with the plastic body to minimize the concentration of forces at the pad-plastic body connection points;

said plural pads including two pads having elevated locations within the front fenders to engage interior roof surfaces of said front fenders;

said plural pads including two additional pads having elevated locations within the rear fenders so as to engage interior roof surfaces of said rear fenders.

* * * * *